(12) United States Patent
Perrie et al.

(10) Patent No.: US 8,467,037 B2
(45) Date of Patent: Jun. 18, 2013

(54) METHOD AND DEVICE FOR OPTIMIZING THE ORIENTATION OF A LASER ANEMOMETER ON AN AIRCRAFT

(75) Inventors: Jean-Damien Perrie, Toulouse (FR); Guillaume Preaux, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 857 days.

(21) Appl. No.: 12/623,118

(22) Filed: Nov. 20, 2009

(65) Prior Publication Data

US 2010/0128252 A1 May 27, 2010

(30) Foreign Application Priority Data

Nov. 24, 2008 (FR) ...................... 08 06588

(51) Int. Cl.
*G01P 3/36* (2006.01)
(52) U.S. Cl.
USPC .......................................... 356/28

(58) Field of Classification Search
USPC .......................................... 356/28, 28.5, 337
See application file for complete search history.

(56) References Cited

U.S. PATENT DOCUMENTS

| 4,652,122 | A | 3/1987 | Zincone et al. |
| 7,561,067 | B2 * | 7/2009 | Matayoshi et al. ........... 340/973 |
| 7,770,445 | B2 * | 8/2010 | Lassouaoui et al. ........ 73/170.11 |
| 7,999,926 | B2 * | 8/2011 | Perrie et al. ...................... 356/28 |
| 2003/0219252 | A1 | 11/2003 | Hays |
| 2004/0027570 | A1 * | 2/2004 | Caldwell et al. .............. 356/338 |

FOREIGN PATENT DOCUMENTS

| EP | 0374027 | 6/1990 |
| WO | WO 02/50565 | 6/2002 |
| WO | WO 2007/017641 | 2/2007 |
| WO | WO 2007/036662 | 4/2007 |

\* cited by examiner

*Primary Examiner* — Mark Hellner
(74) *Attorney, Agent, or Firm* — Novak Druce Connolly Bove + Quigg LLP

(57) ABSTRACT

A method and device for optimizing the orientation of a laser anemometer on an aircraft. The device can determine an optimal orientation of a sighting axis of the anemometer and deduce therefrom the orientations of the other sighting axes.

9 Claims, 4 Drawing Sheets

METHOD AND DEVICE FOR OPTIMIZING THE ORIENTATION OF A LASER ANEMOMETER ON AN AIRCRAFT

CROSS-REFERENCE TO RELATED APPLICATIONS

This application claims priority to French Patent Application 0806588, filed Nov. 24, 2008, the entire contents of which are incorporated herein by reference.

BACKGROUND OF THE INVENTION

1. Field of the Invention

The present invention relates to a method and a device for optimizing the orientation of a laser anemometer which is mounted on an aircraft, in particular a transport airplane, and which is intended for measuring the wind.

More particularly, although not exclusively, this laser anemometer is used to measure the wind when the aircraft is situated on the ground, in particular during a takeoff phase.

It is known that such a laser anemometer uses the frequency shift undergone by a monochromatic light wave, in particular a laser wave, when it is backscattered by aerosols (particles and/or molecules) present in the air. This shift makes it possible to determine the component of the wind speed vector along the sighting axis. More precisely, the laser anemometer emits a laser radiation at a predetermined distance of a few meters or of a few tens of meters beyond the aircraft and receives this laser radiation after backscattering by the air. The component of the speed vector along the laser sighting axis is directly related to the change of the wavelength of the laser radiation. Thus, by emitting three laser radiations in three different directions, the laser anemometer is capable of determining the three components of the wind speed vector.

2. Description of the Prior Art

A system for monitoring anemobaroclinometric parameters on an aircraft is known through the document WO-2007/036662. This monitoring system is intended to monitor the value of anemobaroclinometric parameters pertaining to the flight of the aircraft, namely parameters which are related to the position and to the speed of the aircraft in flight with respect to the surrounding air. This known monitoring system makes provision to use, in addition to standard measurement devices comprising known probes, at least one laser anemometer which is intended to measure a true speed parameter of the aircraft and which is mounted inside the structure of the aircraft. This known system is nevertheless intended solely for carrying out in-flight measurements. For its in-flight use, it exhibits numerous advantages, relative to the use of standard probes which are placed outside the aircraft, and in particular:

absence of drag and noise; and much reduced sensitivity to ice and rain.

Moreover, it is known that it is also necessary to have accurate measurements of the wind on the ground, in particular for the operation of novel systems used on the ground, which are intended in particular to aid the piloting of the aircraft on takeoff.

There exists in particular a novel system intended to improve safety on takeoff. This system verifies that the preparation for takeoff (loading, performance calculation, systems initialization) and the takeoff itself (ground roll, alignment, acceleration) are carried out in a correct manner. Such a system for enhancing safety during takeoff, of TOS type ("Take-Off Securing"), exhibits in particular a function consisting in calculating the estimated distance required for takeoff, as a function of parameters of the aircraft and of the environment, and in comparing this estimated distance with the distance available. In this case, if the estimated takeoff distance is less than the length of the runway available, alerts are triggered to forewarn the pilot. This verification is carried out before the flight, as soon as all the necessary parameters have been inserted into the aircraft's flight management system, and/or at the start of the acceleration of the aircraft, by using the real values measured for some of these parameters.

A system, of TOM type ("Take-Off Monitoring"), which is intended to monitor, in real time, the acceleration of the aircraft on takeoff, is also known. Before takeoff, a theoretical profile of the ground speed, as a function of the distance traveled and of parameters to be inserted by the crew, is established with the aid of a model. During acceleration on takeoff, and up to a predetermined speed, the current profile of the ground speed (as a function of distance) is compared with this theoretical profile, and an alarm is triggered if insufficient performance is detected.

The previous systems, which are activated on the ground, use for their operation, as input to performance calculation models, wind and temperature data. Moreover, the monitoring system of TOM type also uses the true speed of the aircraft. Now, the accuracy and the integrity of the measurements of these parameters, carried out on the ground by a laser anemometer, are currently insufficient for it to be possible to use these measurements in the aforementioned performance calculations.

SUMMARY OF THE INVENTION

The object of the present invention is to remedy these drawbacks. It relates to a method for automatically optimizing the orientation of a laser anemometer (which is mounted on an aircraft and which is intended for measuring the wind), so as to be able to carry out optimal wind measurements on the ground, said laser anemometer comprising at least three different laser axes in relation to which measurements are carried out, and each of which is individually orientable.

For this purpose, according to the invention, said method is noteworthy in that the following series of successive steps is carried out in an automatic manner on the aircraft which is on the ground:

a) for one of said laser axes of the laser anemometer, termed the master axis, a measurement of the speed of the wind on the ground in relation to this master axis is carried out each time for a plurality of different orientations of this master axis, the norm of the wind speed vector projected onto this master axis is subsequently determined each time on the basis of this measurement, the norms obtained on the basis of the measurements carried out for said plurality of different orientations are compared with one another, and the orientation for which the corresponding norm of the speed vector exhibits the highest value is selected as orientation of said master axis;

b) the orientations of at least two other laser axes of said laser anemometer are determined by selecting orientations which are symmetric with said orientation selected for the master axis, relative respectively to two predetermined reference planes which are defined in relation to the structure of the aircraft; and c) the orientations of the laser axes of the laser anemometer are fixed at said orientations thus selected, along which the laser anemometer can then carry out measurements of the wind (which are particularly accurate).

Thus, by virtue of the invention, the orientation of the laser axes of a laser anemometer which is mounted on an aircraft is optimized on the ground so as to obtain, in relation to the master axis, the highest possible value of the wind. Consequently, with the aid of this laser anemometer with optimized positioning, very accurate measurements of the wind existing on the ground can be carried out.

These very accurate wind measurements can in particular be used in the aforementioned safety and monitoring systems, which are active during the takeoff of an aircraft, as indicated above.

Within the framework of the present invention, said predetermined reference planes can correspond to all types of planes which can be defined exactly with respect to the structure of the aircraft. Nevertheless, in a preferred embodiment, said reference planes are two planes which are mutually orthogonal, of which a first plane is also orthogonal to the longitudinal axis of the aircraft. Moreover, preferably, the second plane is parallel to the longitudinal axis of the aircraft (or comprises the latter).

Furthermore, in a preferred embodiment, said method is intended for a laser anemometer comprising, in addition to the aforementioned three laser axes, a fourth laser axis (or sighting axis), and it is such that:
  in step b), the orientation corresponding to that obtained by a double symmetry (respectively relative to said two reference planes) of the orientation selected for said master axis is selected as orientation for this fourth laser axis; and
  in step c), the orientations of the four laser axes of the laser anemometer are fixed at said orientations thus selected, along which the laser anemometer can carry out measurements of the wind.

As specified below, the use of a fourth sighting axis for the laser anemometer yields the following advantages:
  possibility of verifying the measurements carried out in relation to the other three axes;
  integrity of the measurement; and
  symmetric installation on the aircraft.

Moreover, in an advantageous manner, to select the orientations of the laser axes, wind information which is for example provided by the aircraft control tower is also taken into account. This wind information is taken into account with the aim of avoiding untimely changes of signs during the measurement of wind speed vectors.

Furthermore, in a particular embodiment, this laser anemometer is arranged on the aircraft so that its laser axes are situated:
  on the top of the fuselage of said aircraft; and/or
  at least a predetermined distance from an antenna of said aircraft.

The present invention also relates to a device for automatically optimizing the orientation of a laser anemometer which is mounted on an aircraft and which is intended for measuring the wind, said laser anemometer comprising at least three laser axes in relation to which it is possible to carry out measurements with the aid of controllable standard measurement means.

According to the invention, said device is noteworthy in that it comprises:
  an assembly of first controllable means, which are able to automatically modify the orientation of the laser axes of the laser anemometer, with which they are respectively associated;
  an element for automatically controlling the first means which are associated with one of said laser axes of the laser anemometer, termed the master axis, so as to be able to bring it into a plurality of different orientations;
  an element for automatically controlling (or triggering) said means for measuring said master axis so that they successively carry out, for each of said plurality of different orientations of this master axis, a measurement of the speed of the wind on the ground in relation to this master axis;
  an element for automatically determining, on the basis of each of these measurements, the norm of the wind speed vector projected onto the master axis;
  an element for automatically comparing, with one another, the norms obtained on the basis of the measurements carried out for said plurality of different orientations;
  an element for automatically selecting, as orientation of said master axis, that for which the corresponding norm of the speed vector exhibits the highest value;
  an element for automatically determining the orientations of at least two other laser axes of said laser anemometer, by selecting orientations which are symmetric with said orientation selected for the master axis, relative respectively to two reference planes which are defined in relation to the structure of the aircraft; and
  an element for automatically controlling the assembly of said first means so as to fix the orientations of the laser axes of the laser anemometer at said orientations thus selected, along which the laser anemometer can then carry out measurements of the wind with the aid of said measurement means.

Moreover, the present invention also relates to:
  a laser anemometer comprising at least three laser axes in relation to which it is possible to carry out measurements with the aid of measurement means, as well as an optimization device such as that mentioned above; and
  an aircraft, in particular a civilian transport airplane, which comprises such a laser anemometer.

BRIEF DESCRIPTION OF THE DRAWING

The figures of the appended drawing will elucidate the manner in which the invention may be embodied. In these figures, identical references designate similar elements.

PREFERRED EMBODIMENTS OF THE INVENTION

Figure 1:
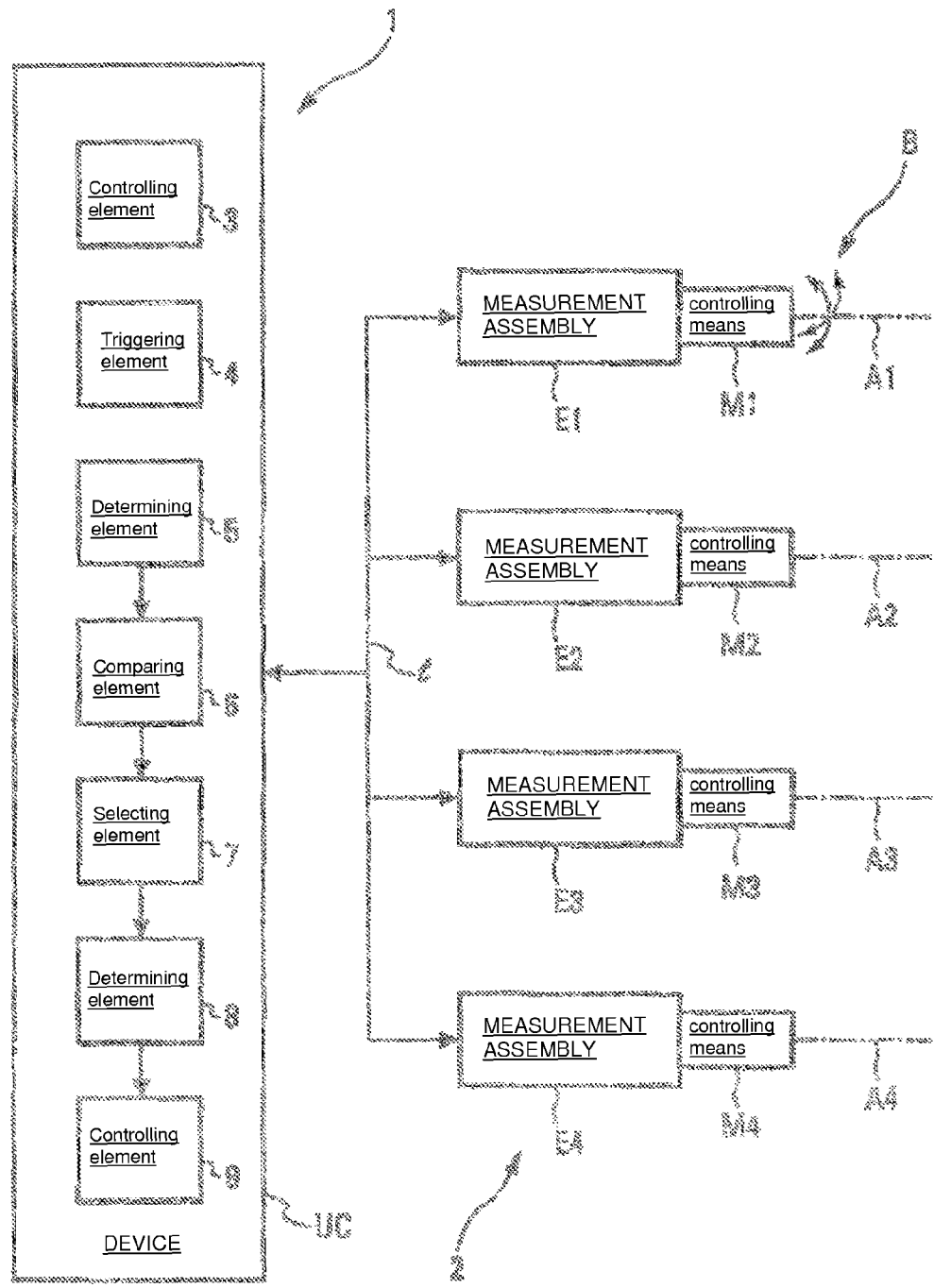
FIG. 1 is the schematic diagram of a device in accordance with the invention.
Figure 2:
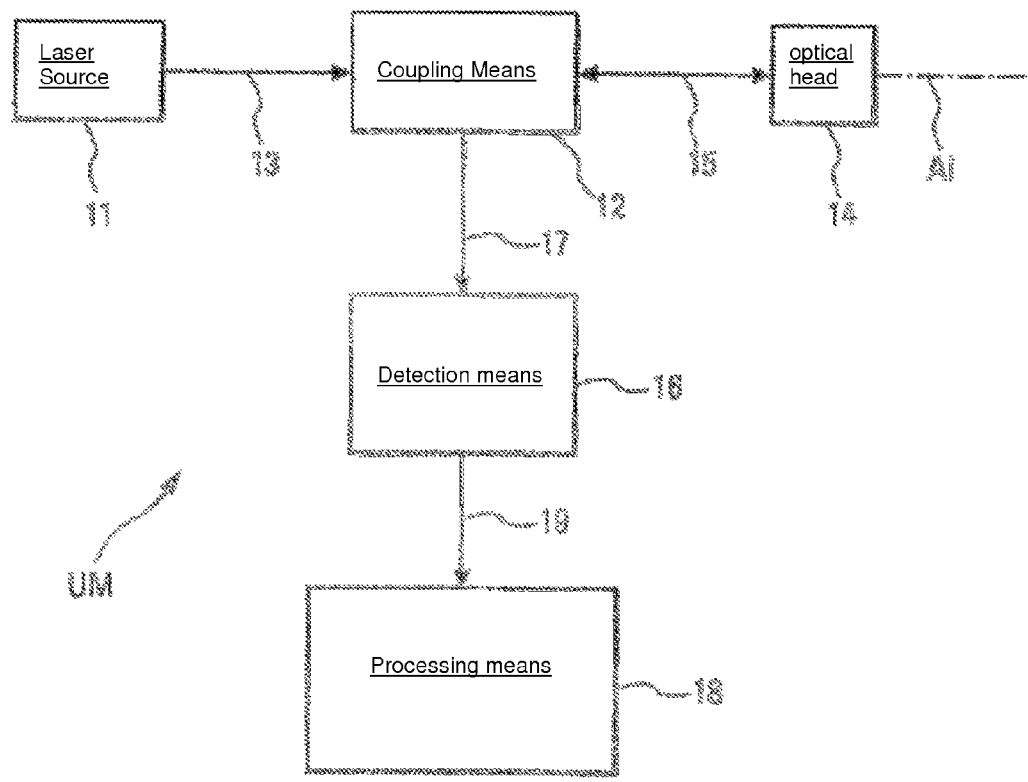
FIG. 2 schematically illustrates a laser anemometer measurement unit.

The device 1 in accordance with the invention and represented schematically in FIG. 1 is intended to optimize the orientation of a laser anemometer 2 which is mounted on an aircraft A, in particular a transport airplane. This laser anemometer 2, which will be further described hereinbelow with reference to FIG. 2, comprises at least three measurement assemblies E1, E2 and E3 comprising integrated measurement means which make it possible to carry out measurements of the wind in relation respectively to three different laser axes (or sighting axes) A1, A2 and A3.

In a preferred embodiment, said laser anemometer 2 comprises a fourth measurement assembly E4 which is intended to carry out measurements in relation to a fourth laser axis A4.

Said device 1 in accordance with the invention, the object of which is therefore to optimize the orientation of the axes A1 to A3 (and optionally A4) of said laser anemometer 2, is carried onboard the aircraft A and comprises, as represented in FIG. 1:
- an assembly of controllable means M1 to M3, each of which is associated with one of the measurement assemblies E1 to E3. These means M1 to M3 are able to automatically modify the orientation of the laser axes A1 to A3 of the laser anemometer 2, with which they are respectively associated, as illustrated by arrows B for the axis A1 of FIG. 1, each of said laser axes A1 to A3 being individually orientable;
- an element 3 for automatically controlling the means M1, M2 or M3 which are associated with one of said laser axes of the laser anemometer 2, termed the master axis (chosen at random), for example the axis A1, so as to orient it successively along a plurality of different orientations. This automatic control is carried out by way of a link, not represented;
- an element 4 for automatically triggering or controlling said measurement means in relation to said master axis A1 so that they carry out, for each of said plurality of different orientations of this master axis A1, each time a measurement of the speed of the wind on the ground in relation to this master axis A1;
- an element 5 for automatically determining, on the basis of each measurement received from said measurement means (for this plurality of orientations), the norm of the wind speed vector projected onto the master axis A1. In a particular embodiment, this norm can be calculated by the measurement means and be received directly from said measurement means by the element 5 which is, in this case, a data reception element;
- an element 6 for automatically comparing, with one another, the norms obtained on the basis of the measurements carried out for said plurality of different orientations;
- an element 7 for automatically selecting, as orientation of said master axis A1, that for which the corresponding norm of the speed vector exhibits the highest value;
- an element 8 for automatically determining the orientations of at least two other laser axes A2, A3 of said laser anemometer 2, by selecting orientations which are symmetric with said orientation selected for the master axis A1, relative respectively to two predetermined reference planes P1 and P2 which are defined in relation to the structure F of the aircraft A; and
- an element 9 for automatically controlling the assembly of said means M1, M2 and M3 by way of links (not represented) so as to fix the orientations of the laser axes A1, A2 and A3 of the anemometer 2 at said orientations thus selected, along which the laser anemometer 2 can then carry out measurements of the wind with the aid of the measurement means (of said measurement assemblies E1 to E3).

In a preferred embodiment, said elements 3 to 9 (or at least some of them) are grouped together in a single central unit UC which is connected to said measurement assemblies E1 to E3, by way of links l.

Thus, the device 1 in accordance with the invention makes it possible to optimize the orientation of the laser axes A1 to A3 of the laser anemometer 2 which is mounted on an aircraft A. Consequently, this laser anemometer 2 is able to carry out very accurate measurements of the wind existing on the ground.

These very accurate wind measurements can in particular be used in standard safety and monitoring systems, which are active during the takeoff of an aircraft.

Furthermore, the device 1 carries out the optimization in an automatic manner, thereby making it possible to reduce the workload of the crew of the aircraft (which consists simply in triggering this optimization with the aid of means, not represented).

It is known that a laser anemometer 2 utilizes the backscattering of a light wave off inhomogeneities of the air due to molecules or particles entrained by the wind. A laser anemometer 2 comprises at least one measurement unit UM such as that represented in FIG. 2. This measurement unit UM comprises, generally at least:
- a laser source 11 for producing a laser radiation;
- a splitting and coupling means 12 which is connected to the laser source 11 by way of a link 13 and which is, moreover, connected to an optical head 14, for example via an optical fiber 15. This optical head 14 defines a laser sighting axis Ai;
- a detection means 16 which is connected to said splitting and coupling means 12 by way of a link 17; and
- a processing means 18 which is connected by way of a link 19 to said detection means 16.

Figure 3:
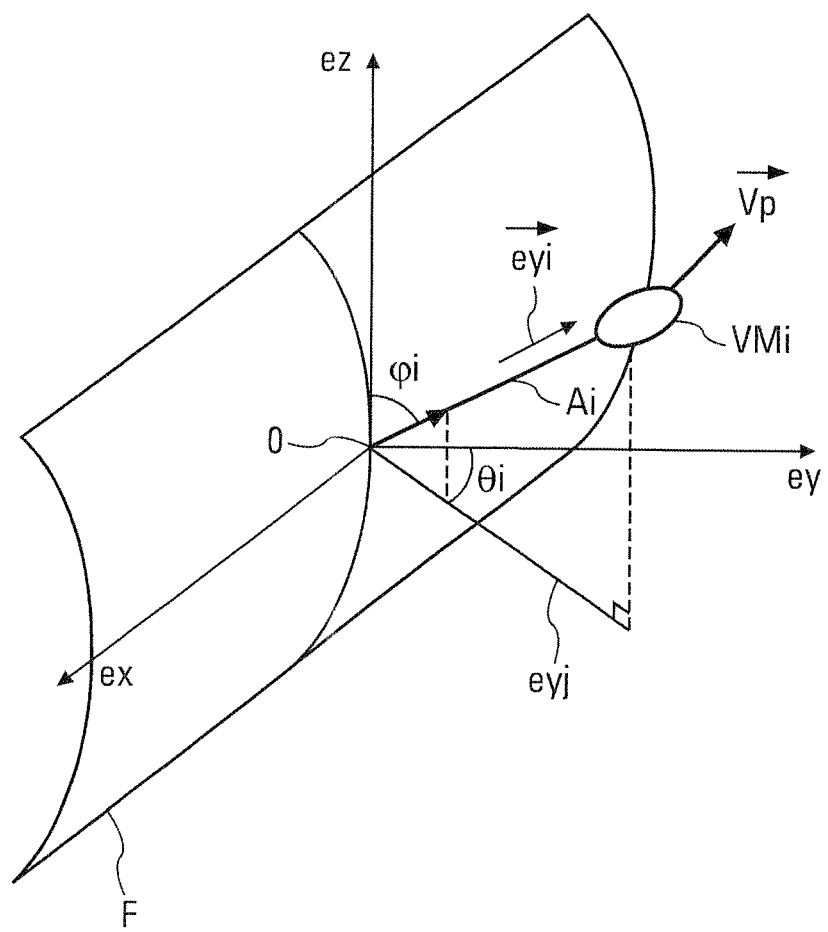
FIG. 3 is a diagram making it possible to explain the way in which the orientation of a master axis is determined.

This measurement unit UM operates as follows. A laser radiation, exhibiting a given optical frequency, is produced by the laser source 11 and is emitted out of the aircraft A, via said optical head 14, along the sighting axis Ai, in a very small measurement volume VMi, for example 2 centimeters wide and 20 micrometers in diameter, as represented in FIG. 3. The return optical signal, which results from the backscattering of a single particle or molecule passing through the measurement volume VMi, is detected. This optical signal is thereafter transposed into an electrical signal. The processing means 18 recovers, by virtue of a suitable signal processing, the speed along the laser axis Ai, with the aid of the following relation (1):

$$\Delta f = (2 \cdot \vec{Vp} \cdot \vec{eyi})/\lambda 0 \quad (1)$$

in which:
- $\Delta f$ is the frequency shift (due to a Doppler effect) between the frequency f0 of the laser radiation emitted and the frequency f1 of the laser radiation detected after backscattering, so that $\Delta f = f1 - f0$;
- $\vec{Vp}$ is the wind speed vector;
- $\vec{eyi}$ is the unit direction vector for the axis Ai; and
- $\lambda 0$ is the wavelength of the laser radiation emitted.

It will be noted that the laser source 11 used in the laser anemometer 2 affords the spatial and spectral coherence thereof, as well as a high intensity. Furthermore, it can be modulated at high frequency or in the form of brief and powerful pulses. It is known that the scattering of light off inhomogeneities of the atmosphere depends mainly on the relative dimension of these inhomogeneities with respect to the wavelength of the laser radiation emitted. If this dimension is close to the wavelength, the scattering regime is the Mie regime. On the other hand, if the relative dimension of the inhomogeneity is very small with respect to the wavelength, the scattering regime is the Rayleigh regime. Generally, an anemometer uses Mie scattering off natural aerosols, especially at low altitude where the density of the aerosols is large. At high altitude, the density decreases greatly, and molecular scattering becomes relevant. Molecules (Rayleigh scattering) exhibit a size of a hundred or so nanometers, and particles (Mie scattering) exhibit a diameter varying from a micrometer to ten micrometers.

Furthermore, the splitting and coupling means 12 makes it possible to split the optical power into a part which is emitted out of the aircraft A and which is intended for optical measurement, and a part which is transmitted to a local oscillator which possesses the same characteristics as the laser source 11. The means 12 also makes it possible to couple the return optical power and a reference, so as to impart the same optical power to each of the pathways with a view to coherent detection by the detection means 16. The detection means 16 makes it possible to transform the optical signal originating from the two pathways into an electrical signal.

Furthermore, an amplifier is integrated into the optical emission assembly. It makes it possible to amplify the low power of the laser source 11 so as to send out sufficient power from the aircraft A, in order to be able to recover a return signal.

As regards the optical head 14, it comprises an assembly of optical elements which can be optimized to compensate for optical defects such as astigmatism, spherical aberrations, etc. The optical head 14 exhibits two functions, namely:
    concentrating the laser beam in the measurement volume VMi; and
    transforming the polarization properties of the light, so as to optimize the return light signal.

This optical head 14 is placed facing an optical window (not represented) which is provided in the structure F of the aircraft A, and which corresponds to a porthole allowing the transmission of the laser radiation out of the aircraft A.

As indicated previously, in accordance with the invention, to determine the optimal orientation of the master axis, various orientations of said master axis are provided, for example the axis Ai of FIG. 3, which correspond each time to a particular value of the angles θi and φi represented in this FIG. 3, and a measurement of the wind speed is carried out along this axis Ai for each of these orientations. In the example of FIG. 3, the angle φi is the angle between the laser axis Ai (with direction $\vec{eyi}$) and an axis ez, and the angle θi is the angle between the projection eyj of the axis Ai onto a plane Oexey and an axis ey. The axes ex, ey and ez are such that they form two planes Oexey and Oeyez which are orthogonal, Oeyez being moreover orthogonal to the longitudinal axis of the aircraft A, and Oexey cutting Oeyez orthogonally at the level of a point O which is situated on the external face of the fuselage F of the aircraft A.

On the basis of each of these measurements, the element 5 deduces the norm Ni of the speed vector $\vec{Vp}$ projected onto the corresponding orientation $\vec{eyi}$ of the master axis Ai, using the aforementioned relation (1). The element 6 inter-compares the norms Ni obtained for the various orientations envisaged, that is to say for the various pairs of values (for example (φiA, θiA; φiB, θiB; φiC, θiC, etc.) for the angles φi and θi. The element 7 deduces therefrom that the pair of values (for example φiB and θiB) corresponding to the selected orientation represents that for which the norm is the highest, that is to say for which the speed projected onto this orientation is the greatest.

Figure 4:
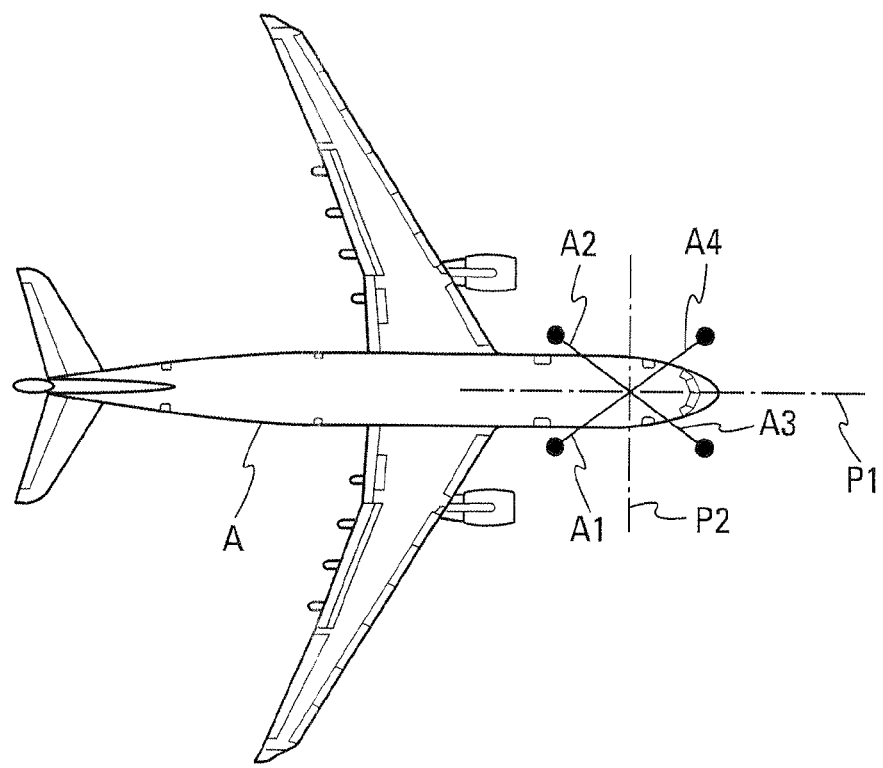
FIG. 4 is a plan view making it possible to explain how the orientations of the other laser axes are determined on the basis of the master axis.

The element 8 determines, thereafter, the other laser axes A2 and A3 through a simple operation of symmetry of the master axis A1, with respect to the reference planes P1 and P2, as is represented in FIG. 4. In the example of FIG. 4, the plane P1 is a vertical plane passing through the longitudinal axis of the aircraft A, and the plane P2 is a vertical plane which is orthogonal to said plane P1.

Thus, the orientation of the laser axes A1 to A3 is optimized so as to recover the best projection of the wind speed vector $\vec{Vp}$ on each of these laser axes A1 and A3.

In a particular embodiment, this orientation of the laser axes A1 to A3 is also optimized so as to avoid untimely changes of sign during the measurement of the speed vectors on the laser axes. Such changes of sign can appear as a function of the relative position of the aircraft A with respect to the direction of the wind. In order to avoid an untimely change of sign problem such as this, the device 1 uses, as input, the measurement of the wind, with which it is for example provided by the control tower (in particular by way of standard link means between said control tower and the aircraft A), and produces a mechanical orientation of the laser axis, as a function of this direction of the wind and of the relative position of the aircraft A.

The datum of the wind can be taken into account manually (by the pilot) or automatically.

When taken into account automatically, the following steps may be implemented:
    the master axis is scanned in the plane Oexey, in jumps of angle values, and the projection of the wind is measured by dichotomy. A maximum value of the projection is thus determined;
    once this operation has been carried out in the plane Oexey, a scan is performed in a plane Oex'ez (where ex' is an axis chosen in the plane Oexey), in the same manner, in jumps of angle values, and in the same manner, a dichotomy-based search is carried out for the maximum value of the projection; and
    the laser axis is then positioned after having determined the maximum of the projection (maximum projection in absolute value, since the wind can exist in all possible directions).

When taken into account manually, the pilot inputs a datum provided by the control tower, and the laser axis positions itself so as to have a maximum projection of the wind vector on the laser axis. This first orientation makes it possible to initialize the master axis, before moving on to an automatic search (such as that specified above). Hence, the search for the optimized direction is therefore faster.

In a preferred embodiment, a fourth laser axis A4 is provided. In this preferred embodiment:
    the element 8 selects, as orientation for the fourth laser axis A4, the orientation corresponding to that obtained through a double symmetry, respectively relative to said two reference planes P1 and P2, of the orientation selected for said master axis A1. In the example of the orthogonal reference planes P1 and P2 of FIG. 4, the laser axis A4 is symmetric with the laser axis A2 with respect to the plane P2 and it is symmetric with the laser axis A3 with respect to the plane P1; and
    the element 9 fixes the orientations of the four laser axes A1 to A4 of the laser anemometer 2 at said orientations thus selected, along which the laser anemometer 2 can then carry out measurements of the wind.

The use of a fourth laser sighting axis A4 for the laser anemometer 2 yields the following advantages:
    possibility of verifying the measurements carried out in relation to the other three axes A1, A2 and A3;
    integrity of the measurement; and
    symmetric installation on the aircraft A, such as represented for example in FIG. 4.

Figure 5:
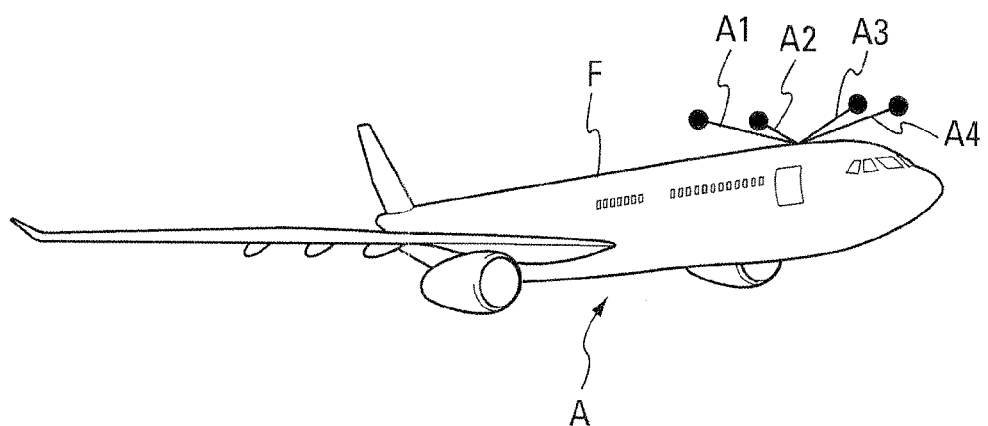
FIG. 5 schematically shows an exemplary orientation of the laser axes of an anemometer on the top of the fuselage of an aircraft.

In a preferred embodiment, as represented by way of illustration in FIG. 5 on which the four laser sighting axes A1 to A4 have been represented, the laser anemometer 2 exhibits the following characteristics:

- its laser axes A1 to A4 are envisaged on the top of the fuselage F of the aircraft A;
- its laser axes A1 to A4 are not placed in proximity to an antenna, so as to avoid interactions or the masking of the laser radiations; and
- it is integrated in such a way as to allow a rotation of the optical heads 14, so as to best optimize the angles of the laser axes A1 to A4 with the direction of the wind.

Within the framework of the present invention, the laser anemometer 2 can correspond to any laser anemometer able to carry out measurements of the wind speed vector in relation to at least three different laser axes (sighting axes), and preferably in relation to four different laser axes, whatever its technical embodiment. In particular, each measurement assembly E1, E2, E3, E4 of the anemometer 2 can comprise, separately, a measurement unit UM such as that represented in FIG. 2.

It is also conceivable for the various measurement assemblies E1 to E4 of the anemometer 2 to comprise common elements, in particular the laser source 11, and for only certain elements to be envisaged separately and individually for each measurement assembly E1 to E4. By way of example, each measurement assembly E1 to E4 can comprise an individual optical head 14 and each of these optical heads 14 can be connected by an individual optical fiber 15 to the splitting and coupling means 16 which is, for its part, common to said measurement assemblies E1 to E4, as well as all the other elements 11, 16 and 18 represented in FIG. 2.

Moreover, within the framework of the present invention, the modification of the orientation of a laser axis A1 to A4 (with the aid of the means M1 to M4) can be carried out in various ways. By way of illustration, this modification of the orientation can, for example, be carried out by an angular displacement of the optical head 14 or else by the adjustment of optical elements forming for example part of the optical head 14 (which in this case can be fixed).

It will be noted that the means for modifying the orientation are mechanical means. It is possible to conceive of a single mechanical head with four independent optical sights, or else a single laser providing four sources by virtue of splitters and a piezoelectric assembly allowing the independent motion of four mirrors in 3 dimensions.

The invention claimed is:

1. A method for optimizing the orientation of a laser anemometer which is mounted on an aircraft and which is intended for measuring the wind, said laser anemometer comprising at least three laser axes in relation to which measurements are carried out, and each of which is individually orientable, according to which method the following series of successive steps is carried out in an automatic manner on the aircraft which is on the ground:

a) for one of said laser axes of the laser anemometer, termed the master axis, a measurement of the speed of the wind on the ground in relation to this master axis is carried out each time for a plurality of different orientations of this master axis, the norm of the wind speed vector ($\vec{Vp}$) projected onto this master axis is determined each time on the basis of this measurement, the norms obtained on the basis of the measurements carried out for said plurality of different orientations are compared with one another, and the orientation for which the corresponding norm of the speed vector exhibits the highest value is selected as orientation of said master axis;

b) the orientations of at least two other laser axes of said laser anemometer are determined by selecting orientations which are symmetric with said orientation selected for the master axis, relative respectively to two predetermined reference planes which are defined in relation to the structure of the aircraft; and c) the orientations of the laser axes of the laser anemometer are fixed at said orientations thus selected, along which the laser anemometer can then carry out measurements of the wind.

2. The method as claimed in claim 1, wherein said reference planes are two planes which are mutually orthogonal, one of which is, moreover, orthogonal to the longitudinal axis of the aircraft.

3. The method as claimed in claim 1, for a laser anemometer comprising, in addition to said three laser axes, a fourth laser axis, wherein:

in step b), the orientation corresponding to that obtained by a double symmetry, respectively relative to said two reference planes, of the orientation selected for said master axis is selected as orientation for the fourth laser axis; and in step c), the orientations of the four laser axes of the laser anemometer are fixed at said orientations thus selected, along which the laser anemometer can carry out measurements of the wind.

4. The method as claimed in claim 1, wherein, to select the orientations of the laser axes, wind information is taken into account, with the aim of avoiding untimely changes of signs during the measurement of wind speed vectors.

5. The method as claimed in claim 1, wherein the laser anemometer is arranged on the aircraft so that its laser axes are situated on the top of the fuselage of said aircraft.

6. The method as claimed in claim 1, wherein the laser anemometer is arranged on the aircraft so that its laser axes are situated at least a predetermined distance from an antenna of said aircraft.

7. A device for optimizing the orientation of a laser anemometer which is mounted on an aircraft and which is intended for measuring the wind, said laser anemometer comprising at least three laser axes in relation to which it is possible to carry out measurements wherein said device comprises:

an assembly of first controllable orientation adjuster, which is able to automatically modify the orientation of the laser axes of the laser anemometer, with which they are respectively associated, each of said laser axes being individually orientable;

an element for automatically controlling the first orientation adjuster which is associated with one of said laser axes of the laser anemometer, termed the master axis, so as to be able to bring it into a plurality of different orientations;

an element for automatically controlling said orientation adjuster for measuring said master axis so that they carry out, for each of said plurality of different orientations of this master axis, a measurement of the speed of the wind on the ground in relation to this master axis;

an element for automatically determining, on the basis of each of these measurements, the norm of the wind speed vector projected onto the master axis; an element for automatically comparing with one another the norms obtained on the basis of the measurements carried out for said plurality of different orientations;

an element for automatically selecting, as orientation of said master axis, that for which the corresponding norm of the speed vector exhibits the highest value;

an element for automatically determining the orientations of at least two other laser axes of said laser anemometer, by selecting orientations which are symmetric with said orientation selected for the master axis, relative respectively to two predetermined reference planes which are defined in relation to the structure of the aircraft; and an element for automatically controlling the assembly of said first orientation adjuster so as to fix the orientations of the laser axes of the laser anemometer at said orientations thus selected, along which the laser anemometer can then carry out measurements of the wind.

8. An aircraft comprising the device according to claim 7.

9. The device according to claim 7, wherein the device is part of an aircraft.

\* \* \* \* \*